US00RE36928E

United States Patent [19]

Newhouse et al.

[11] E Patent Number: Re. 36,928

[45] Reissued Date of Patent: Oct. 31, 2000

[54] INFORMATION CARD MOUNTED TO A CHAIR

[75] Inventors: Thomas J. Newhouse, Grand Rapids; Marc A. Gierz, Hudsonville; Richard C. Weise, Coopersville, all of Mich.

[73] Assignee: Herman Miller Inc., Zeeland, Mich.

[21] Appl. No.: 09/126,073

[22] Filed: Jul. 30, 1998

Related U.S. Patent Documents

Reissue of:

[64] Patent No.: 5,700,051
Issued: Dec. 23, 1997
Appl. No.: 08/650,970
Filed: May 21, 1996

U.S. Applications:

[

[63] Continuation of application No. 08/259,035, Jun. 13, 1994, abandoned.

[51] Int. Cl.[7] ..... A47C 7/62

[52] U.S. Cl. ..... 297/188.11; 40/320; 40/649; 297/217.1

[58] Field of Search ..... 297/188.08, 188.11, 297/188.12, 217.1, 463.1, 463.2; 40/320, 490, 491, 649

[56] References Cited

U.S. PATENT DOCUMENTS

| | | | |
|---|---|---|---|
| 2,064,749 | 12/1936 | Huber | 40/491 |
| 2,131,586 | 9/1938 | Dano | 40/320 |
| 2,545,262 | 3/1951 | Coleman | 40/649 |
| 3,991,495 | 11/1976 | Wilson | 40/375 |
| 4,715,652 | 12/1987 | Ward | 297/188.11 X |

FOREIGN PATENT DOCUMENTS

| | | | |
|---|---|---|---|
| 154972 | 8/1932 | Switzerland | 297/217.1 |

OTHER PUBLICATIONS

HÅG Credo Collection Brochure, (date unknown).
HÅG Signét Collection Brochure, (date unknown).
The HÅG Digest, Jun. 1993.
IBM Series III Model 50 Key Operator Instructions, p. 4 (date unknown).
Copier Specs, p. 77 (date unknown).
Canon Model NP 7550 Copier.

*Primary Examiner*—Peter R. Brown
*Attorney, Agent, or Firm*—Brinks Hofer Gilson & Lione

[57] ABSTRACT

An operational guide mounted to an adjustable chair as well as a chair including an operational guide. The operational guide includes a card having a pictorial guide for operating the adjustable chair located on the top side of the card. The operational guide also includes a device for mounting the card to the bottom of the seat of the chair. The mounting device is adapted to allow the card to move between an extended position wherein the pictorial guide is visible to an occupant of the chair and a retracted position wherein the pictorial guide is not visible to the occupant of the chair. Also, the mounting device holds the card so that the orientation of the pictorial guide corresponds to the orientation of the controls for adjusting the chair when the card is in the extended position.

32 Claims, 4 Drawing Sheets

INFORMATION CARD MOUNTED TO A CHAIR

Matter enclosed in heavy brackets [ ] appears in the original patent but forms no part of this reissue specification; matter printed in italics indicates the additions made by reissue.

This application is a *reissue of Ser. No. 650,970 filed May 21, 1996, now U.S. Pat. No. 5,700,051, which is a* continuation application of Ser. No. 259,035, filed Jun. 13, 1994, now abandoned.

BACKGROUND OF THE INVENTION

The present invention relates to furniture. More specifically, the invention relates to an operational guide for use with an adjustable chair.

Currently, many chairs used in an office setting are adjustable in one or more ways. Because the nature of the adjustments and the mechanisms for making them vary from chair to chair, an information card with instructions for the user is often provided. Typically, such information cards are loosely fastened to the chair with a string or the like. Unfortunately, such loosely fastened information cards are unsightly and easily removable. Thus, these cards are often removed from the chair during installation so the actual chair user never sees the information card.

Another problem with some chair information cards is that they are not easily understood. In particular, since the adjustment mechanisms are often located on the bottom of the seat where they cannot be seen by the user sitting in the chair, it can be difficult for the user to understand the instructions for making adjustments.

For the foregoing reasons, there is a need for a chair having an information card that is attached to the chair in such a way so as to better insure that the chair user will have access to it, and that the instructions on the card will be easier to understand. Moreover, even if the original chair user sees the instruction card, office chairs are frequently moved from one work station to another. Subsequent chair users are even less likely to see the information card.

SUMMARY OF THE INVENTION

The invention is an operational guide mounted to an adjustable chair as well as a chair including an operational guide. The operational guide includes a card having a pictorial guide for operating the adjustable chair located on the top side of the card. The operational guide also includes a device for mounting the card to the bottom of the seat of the chair. The mounting device is adapted to allow the card to move between an extended position wherein the pictorial guide is visible to an occupant of the chair and a retracted position wherein the pictorial guide is not visible to the occupant of the chair. Also, the mounting device holds the card so that the orientation of the pictorial guide corresponds to the orientation of the controls for adjusting the chair when the card is in the extended position.

An advantage of the preferred embodiment is that a user, while seated in the chair, may conveniently move the information card into the extended position to view the chair operating information. When the card is in the extended position, the orientation of the pictorial guide on the top of the card corresponds to the orientation of the controls for adjusting the chair, thus providing easier to understand instruction.

Another advantage of the preferred embodiment is that an information card holder is mounted to the chair so that the holder may not be easily removed from the chair. Moreover, the preferred embodiment avoids use of unsightly tags or the like dangling from the chair.

BRIEF DESCRIPTION OF THE DRAWING

These and other features, aspects, and advantages of the present invention will become better understood with regard to the following description, appended claims, and accompanying drawings where:

DETAILED DESCRIPTION OF THE PREFERRED EMBODIMENT

Figure 1:
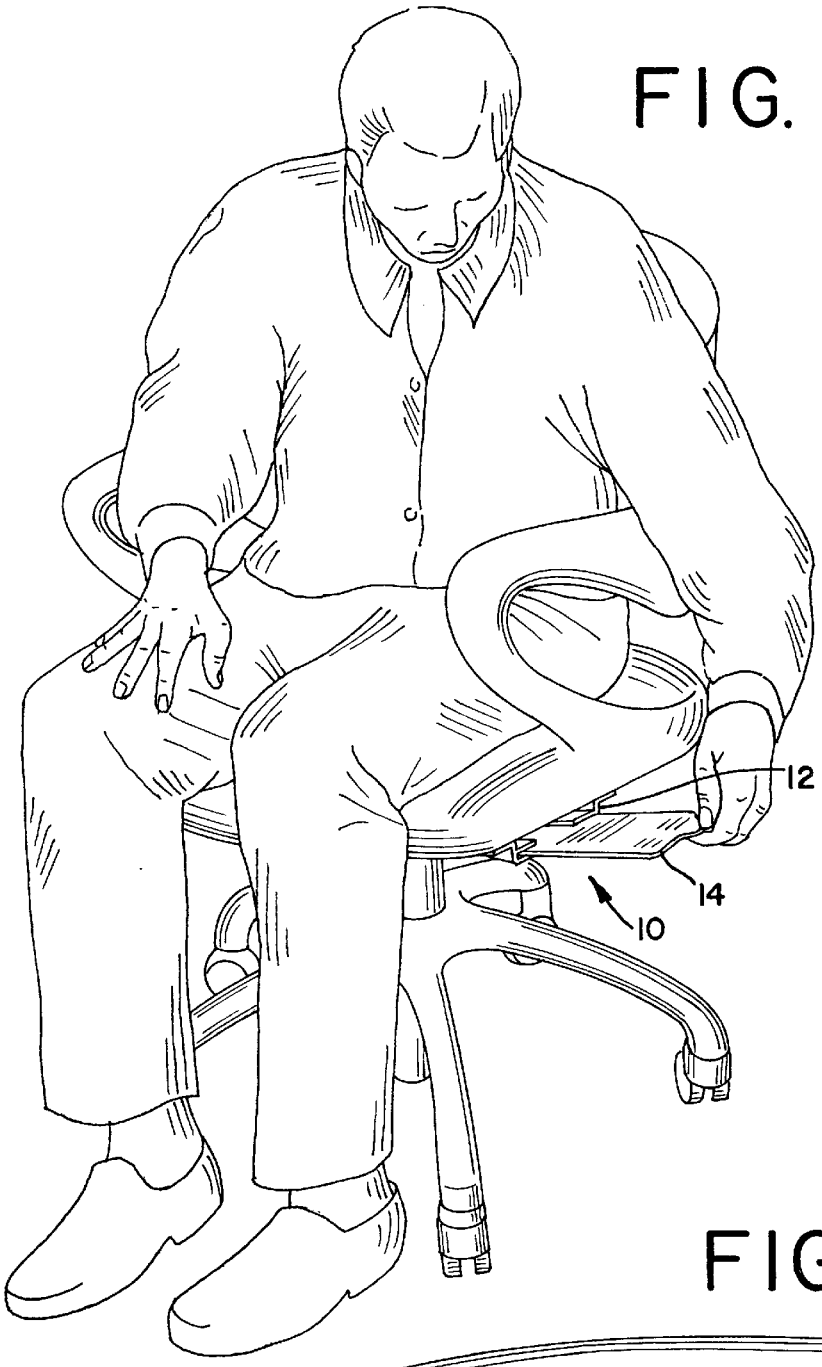
FIG. 1 shows a man using a preferred embodiment of the invention.

FIG. 1 shows a chair 10, a holder 12 mounted to the chair 10, and an information card 14 that slides into the holder 12. The information card holder 12 is positioned under the seat of the chair to properly orient the information card 14, thereby allowing improved user instruction. The information card 14 for informing a chair's user of proper operating methods is mounted to the chair 10 so that the information card 14 can not be easily removed from the chair 10. (See also FIG. 5) The information card 14 is preferably made of a heavy plastic material, such as polypropylene.

Figure 2:
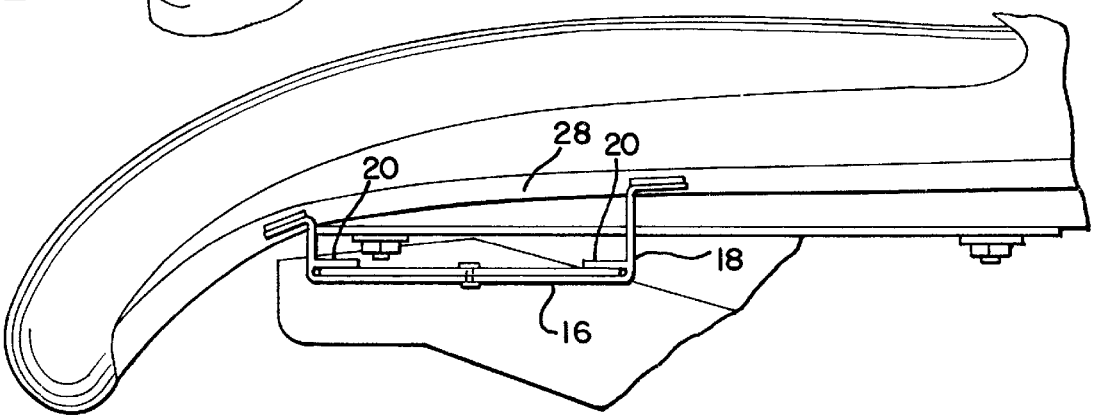
FIG. 2 shows a side view of the seat of the chair of FIG. 1 disclosing a more detailed view of the information card holder.

FIG. 2 shows that the holder 12 contains a bottom plate 16 and side walls 18 connected to the bottom plate. Preferably, the bottom plate 16 is positioned a minimum of 0.6" below the seat 28 of the chair 10 at one end of the holder 12 and a maximum of 1.1" below the seat 28 of the chair 10 at the other end of the holder 12. Additionally, the seat 28 preferably forms a minimum angle of 70 degrees with one of the side walls 18 proximate one end of the holder 12 and a maximum angle of 90 degrees with the other side wall 18 proximate the other end of the holder 12.

A pair of flanges 20 spaced apart from the bottom plate 16 extend inwardly from the side walls 18 of the holder 12. Preferably, each flange 20 forms a 90 degree angle with its corresponding side wall 18. The flanges 20 function as a guide member for guiding the information card 14 within the holder 12 in a travel path parallel to the holder 12.

Figure 3:
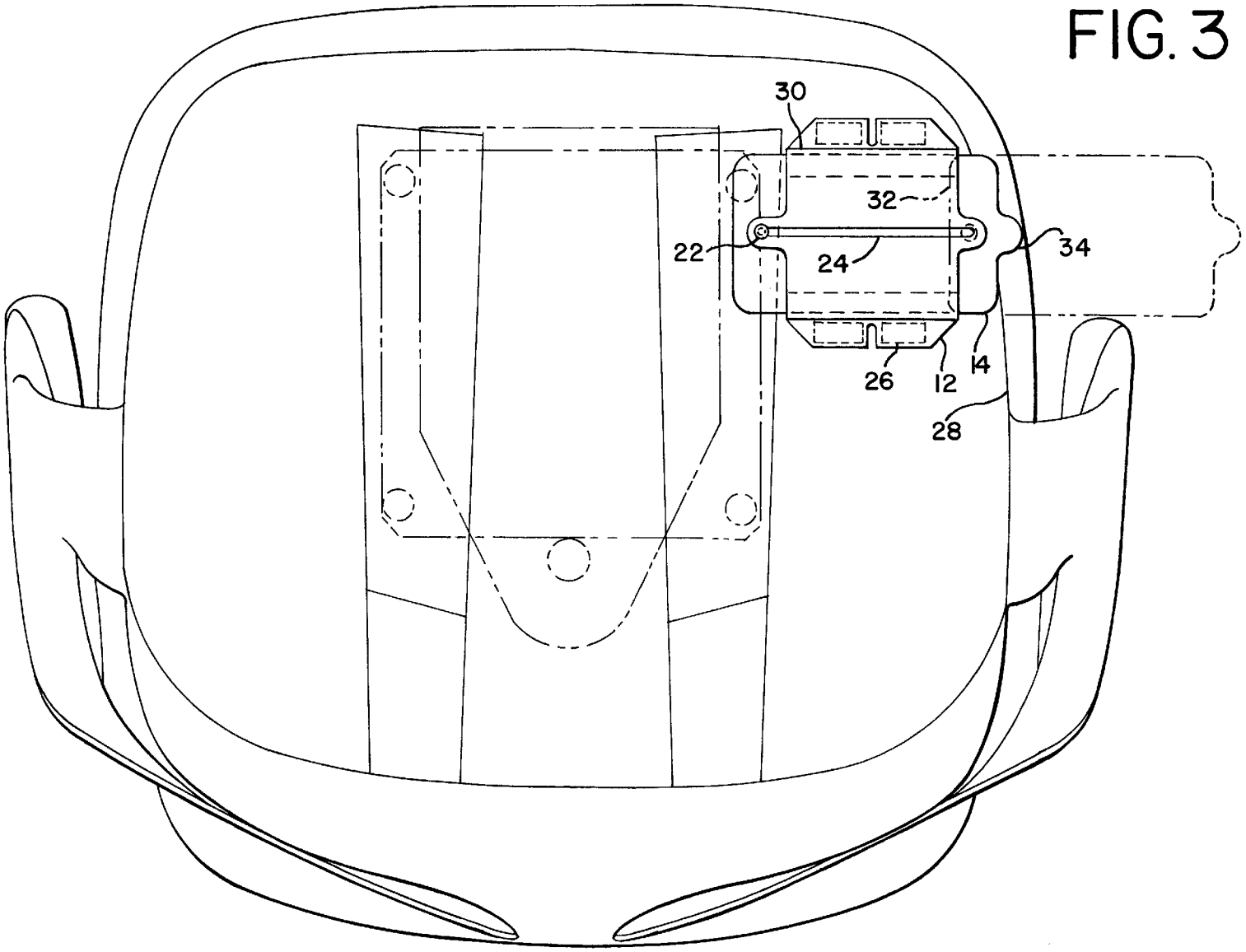
FIG. 3 shows bottom view of the seat of the chair of FIG. 1.
Figure 3A:
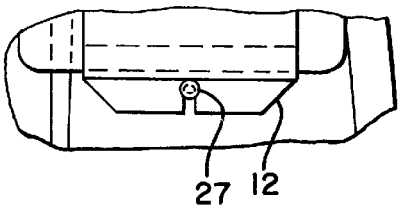
FIG. 3A shows an alternative embodiment of the invention where the holder is mounted to the chair with fasteners.
Figure 3B:
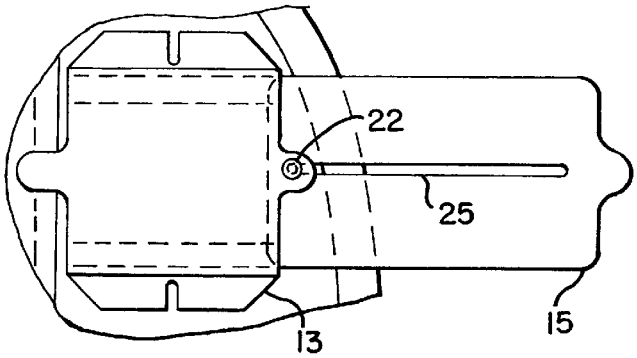
FIG. 3B shows an alternative embodiment of the invention where a longitudinal slot is positioned in the card.

FIG. 3 shows a travel limiting member 22, which as shown is preferably a rivet, connecting the holder 12 and the card 14. The travel limiting member 22 extends through a longitudinal slot 24 formed in the middle of the holder 12 mounting the information card 14 to the holder 12. Alternatively, as shown in FIG. 3B, the travel limiting member 22 can extend through a longitudinal slot 25 formed in the information card so as to mount the information card 15 to a holder 13. Preferably, the combination of the travel limiting member 22 and the longitudinal slot 24 should limit the travel of the information card 14 to a travel length of about 4.75".

Two-sided tape 26 is used to mount the holder 12 to the seat 28 of the chair 10. The two-sided tape 26 preferably is made of foam material and forms a rectangular shape having dimensions of 0.5" by 1".Alternatively, the holder 12 can be mounted to the seat 28 of the chair 10 with fasteners 27 as shown in FIG. 3A.

FIG. 3 shows a card 14 having a length 30 greater than its width 32. Preferably, the information card 14 has a length 30 of 6.25" and a width 32 of 4.75".

The information card 14 contains a tab 34 at one end. The tab 34 extends from the holder 12 even when a majority of the card 14 is inside the holder 12. The tab 34 allows a user to easily slide the information card 14 out from under the chair seat 28. Preferably the tab 34 forms a substantially semicircular shape having a radius of 0.6"–0.7".

A user may grip the tab 34 and slide the information card 14 from a retracted position wherein at least a major portion of the top side of the card 14 is not visible to the occupant of the chair to an extended position wherein at least a major portion of the top side of the card 14 is visible to an occupant of the chair 10. A pictorial guide 38 for operating the chair is located on the top side of the card 14. Moreover, the invention is adapted to hold the card 14 so that the orientation of the pictorial guide 38 corresponds to the orientation of the means for adjusting the chair 10 when the card 14 is in the extended position.

Figure 4:
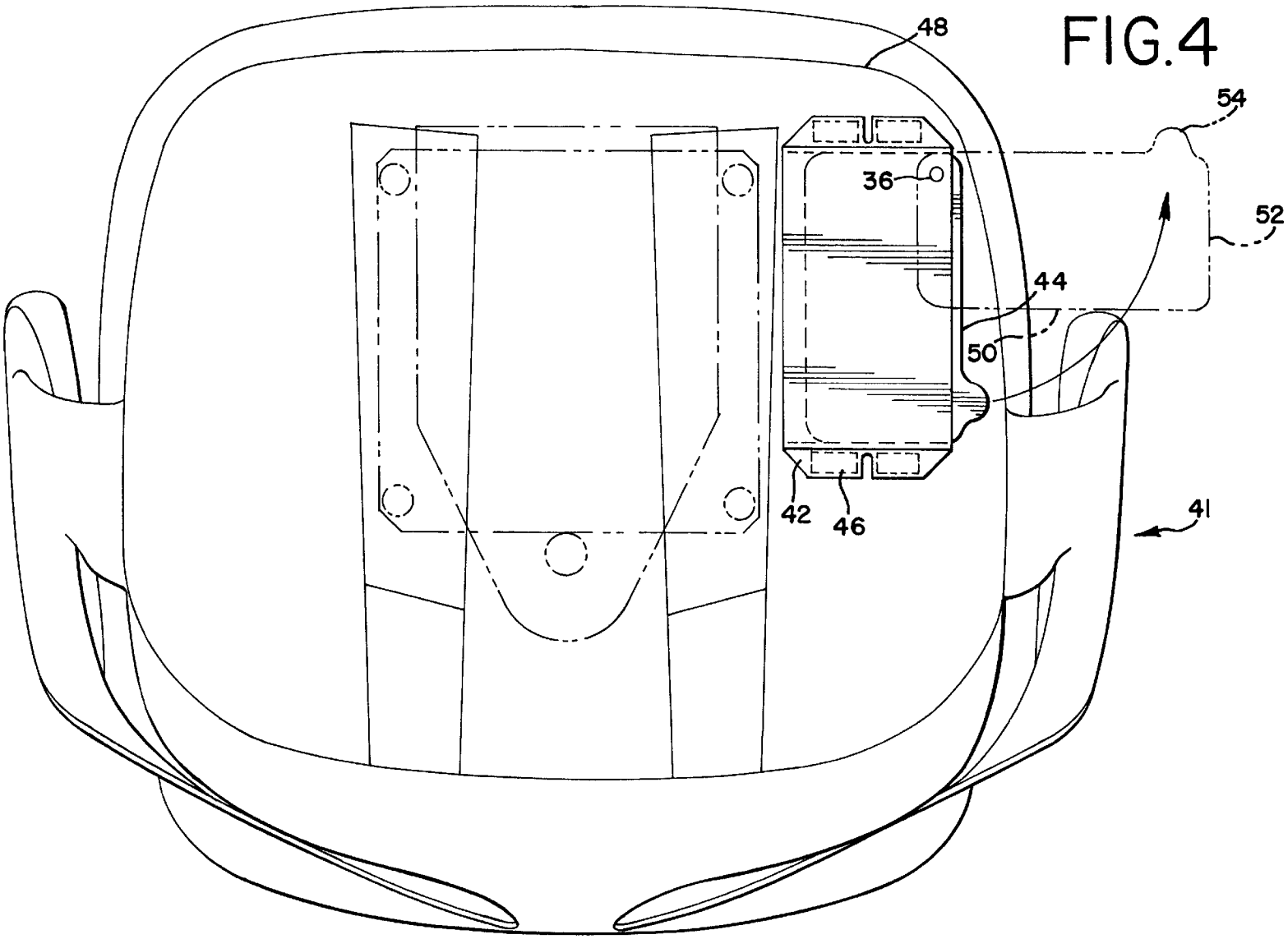
FIG. 4 shows an alternative embodiment of the invention where the information card is mounted to the chair using a pivot.

FIG. 4 shows a second preferred embodiment of the invention. FIG. 4 shows a pivot point 36, such as a rivet, pivotally mounting a card 44 to a mounting means such as a holder 42. The information card 44 is preferably made of a heavy plastic material, such as polypropylene.

The pivot point 36 is positioned in combination with the card 44 and the holder 42 to allow the card 44 to rotate about a generally horizontal plane between an extended position wherein the pictorial guide 38 is visible to an occupant of a chair 41 and a retracted position wherein the pictorial guide 38 is not visible to the occupant of the chair. Moreover, the pivot point 36 is adapted to hold the card 44 so that the orientation of the pictorial guide 38 corresponds to the orientation of the means for adjusting the chair 41 when the card 44 is in the extended position.

Two-sided tape 46 is used to mount the holder 42 to the seat 48 of the chair 41. The two-sided tape 46 preferably is made of foam material and forms a rectangular shape having dimensions of 0.5" by 1".

FIG. 4 shows a holder 42 having a length 50 greater than its width 52. Preferably, the information card has a length 50 of 6.25" and a width 52 of 4.75".

The information card 44 contains a tab 54 at one end. The tab 54 extends from the holder 42 even when a majority of the card 44 is inside the holder 42. The tab 54 allows a user to easily slide the information card 44 out from under the chair seat 48. Preferably the tab 54 forms a substantially semicircular shape having a radius of 0.6"–0.7–.

Figure 5B:
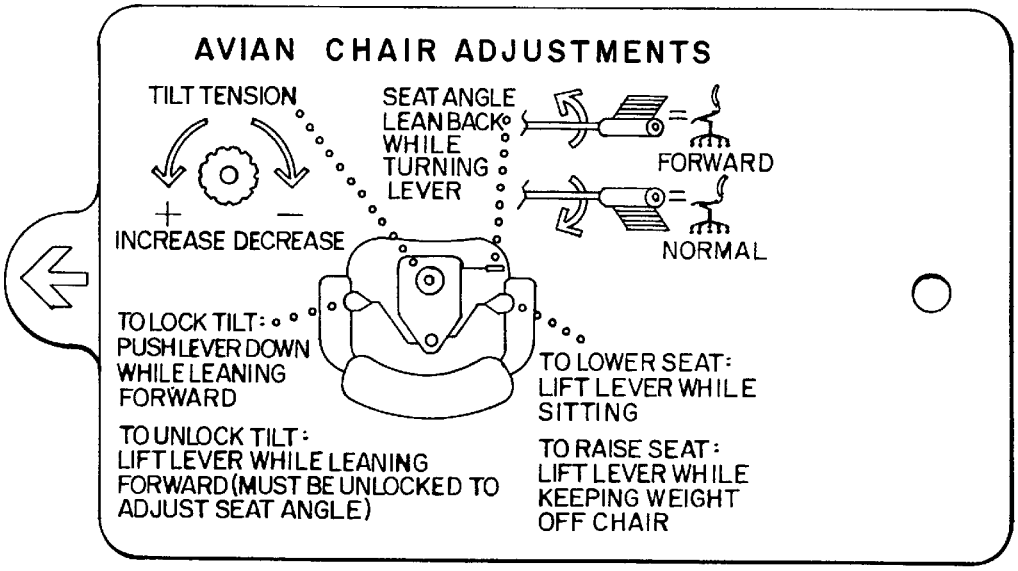
FIG. 5B shows an alternative pictorial guide.
Figure 5A:
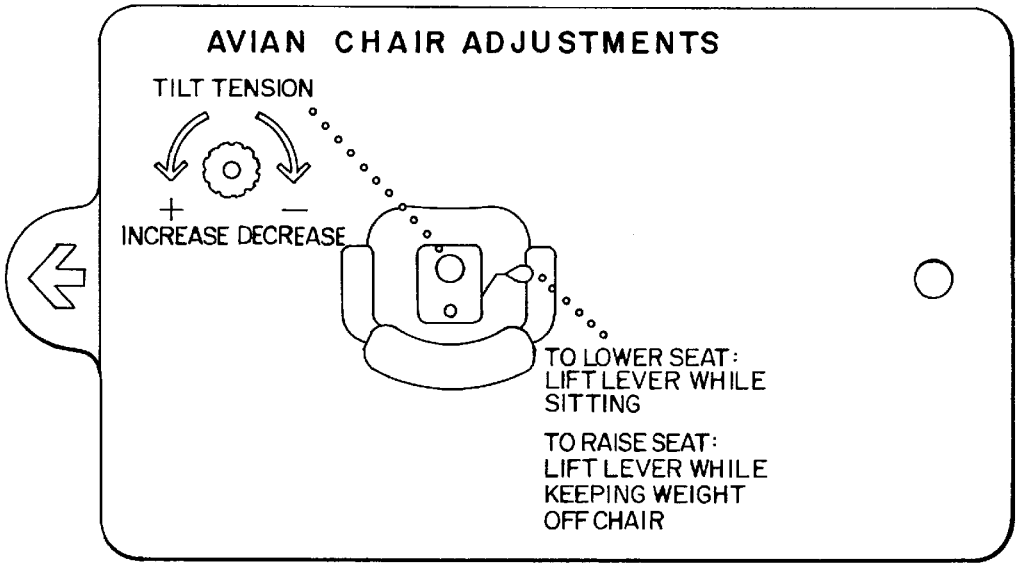
FIG. 5A shows an exemplary pictorial guide.

FIG. 5 shows an example of a pictorial guide 38 located on the top side of the information card 14. When the information card 14 is in the extended position, the pictorial guide is oriented so that the adjustment instructions 40 depicted in the pictorial guide 38 correspond to the orientation of the actual method for adjusting the chair 10. In other words, the adjustment features on the right side of the chair are shown on the right side of the card and vice versa.

The foregoing detailed description should be regarded as illustrative rather than limiting and the appended claims including all equivalents are intended to define the scope of the invention.

What is claimed is:

1. An operational guide for mounting to a chair having a seat and means for adjusting the chair, the operational guide comprising:

a card with a pictorial guide for operating the chair located on the top side of the card;

a holder for slidably mounting the card to the bottom of the seat;

a travel limiting member for moveably securing the card to the holder and for preventing separation of the card from the holder so that the card can only move between an extended position and a retracted position in relation to the holder;

a [mounting] *fixing* means for attaching a top side of the holder corresponding to the top side of the card to a bottom of the chair, the [mounting] *fixing* means *and holder* adapted to allow the card to move between the extended position wherein the pictorial guide is visible to an occupant of the chair and the retracted position wherein the pictorial guide is not visible to the occupant of the chair, the [mounting] *fixing* means also adapted to hold the holder so that the orientation of the pictorial guide is required to correspond to the orientation of the means for adjusting the chair when the card is in the extended position.

2. The operational guide of claim 1, wherein said travel limiting member extends from the card, the travel limiting member operatively engaging the holder to limit travel of the card within the holder.

3. The operational guide of claim 2, wherein the travel limiting member is mounted to the card and extends through a longitudinal slot formed in the holder.

4. The operational guide of claim 3, wherein the longitudinal slot is positioned in the middle of the holder.

5. The operational guide of claim 1, wherein said travel limiting member extends from the holder, the travel limiting member operatively engaging the card to limit travel of the card within the holder.

6. The operational guide of claim 5, wherein the travel limiting member is mounted to the holder and extends through a longitudinal slot formed in the card.

7. The operational guide of claim 5, wherein the travel limiting member is a rivet.

8. The operational guide of claim 1 wherein the [mounting] *fixing* means comprises a two-sided tape disposed on the top side of the holder for detachably mounting the holder to the chair.

9. The operational guide of claim 1, wherein the information card has a length greater than its width.

10. The operational guide of claim 1, wherein the information card contains a tab at one end that is readily grippable by the chair occupant.

11. The operational guide of claim 1, wherein the holder includes a bottom plate and the holder includes a guide member for guiding the information card within the holder in a travel path parallel to the bottom plate.

12. The operational guide of claim 11, wherein the holder includes side walls, and the guide member comprises a pair of flanges extending inwardly from the side walls and spaced apart from the bottom plate.

13. The operational guide of claim 1, wherein the card is pivotally mounted to the [mounting means] *holder* whereby the card is adapted to rotate about a generally horizontal plane between the extended and the retracted position.

14. The operational guide of claim 13, further comprising a first and second rotation limiting member to stop the card in the extended and the retracted position respectively.

15. The operational guide of claim 1, wherein the [mounting] *fixing* means comprises a fastener detachably mounting the holder to the chair.

16. A chair comprising:

a seat;

means located under the seat for adjusting the chair;

a card having a pictorial guide for operating the chair located on the top side of the card; and means for mounting the card to the bottom of the seat, the mounting means adapted to allow the card to move between an extended position wherein the pictorial guide is visible to an occupant of the chair and a retracted position wherein the pictorial guide is not visible to the occupant of the chair, the mounting means also adapted to hold the card so that the orientation of the pictorial guide is required to correspond to the orientation of the means for adjusting the chair when the card is in the extended position.

17. The chair of claim 16, wherein the card is pivotally mounted to the mounting means whereby the card is adapted to rotate about a generally horizontal plane between the extended and the retracted position.

18. The chair of claim 17, further comprising a first and second rotation limiting member to stop the card in the extended and the retracted position respectively.

19. The chair of claim 16, wherein the mounting means includes a holder mounted to the bottom of said chair, the holder includes a bottom plate and the holder includes a guide member for guiding the information card within the holder in a travel path parallel to the bottom plate.

20. The chair of claim 19, wherein the holder includes side walls, and the guide member comprises a pair of flanges extending inwardly from the side walls and spaced apart from the bottom plate.

21. The chair of claim 19, further comprising a travel limiting member extending from one of the holder and card, the travel limiting member engaging the other of the holder and card to limit travel of the card within the holder.

22. The chair of claim 21, wherein the travel limiting member is mounted to the card and extends through a longitudinal slot formed in the holder.

23. An operational guide for a chair having a seat and at least one adjustment mechanism for adjusting the chair, the operational guide comprising:

a card with a pictorial guide for operating the at least one adjustment mechanism, said pictorial guide located on a top side of the card; and a holder comprising a top side corresponding to a top side of the card, said top side of said holder adapted to be attached to a bottom of the seat, the holder including a travel limiting member, the holder with the travel limiting member adapted to allow the card to move between an extended position wherein the pictorial guide is visible to an occupant of the chair and a retracted position wherein the pictorial guide is not visible to the occupant of the chair, the holder with its travel limiting member also adapted to prevent the card from being separated from the holder; the holder with its travel limiting member further adapted to hold the card so that the orientation of the pictorial guide is required to correspond to the orientation of the at least one adjustment mechanism when the card is in the extended position.

24. The operational guide of claim 23 wherein the card slides within the holder and is allowed to slide linearly between the retracted and extended positions.

25. The operational guide of claim 23 wherein the card is adapted to rotate about a vertical axis between the retracted and extended positions.

26. The operational guide of claim 23 wherein the card includes a tab which protrudes from a main portion of the card, which tab is visible to and grippable by the occupant of the chair when the card is in the retracted position.

27. The operational guide of claim 23 wherein the pictorial guide includes both pictures and text.

28. A chair comprising:

a seat;

at least one adjustment mechanism allowing a user to adjust the chair to his liking;

a card with a pictorial guide for operating the at least one adjustment mechanism;

a card holder attached to the seat, the card holder including a travel limiting member, the holder with the travel limiting member adapted to allow the card to move between an extended position wherein the pictorial guide is visible to an occupant of the chair and a retracted position wherein the pictorial guide is not visible to the occupant of the chair, the holder with its travel limiting member also adapted to prevent the card from being separated from the holder; the holder with its travel limiting member further adapted to hold the card so that the orientation of the pictorial guide is required to correspond to the orientation of the adjustment mechanism when the card is in the extended position.

29. The chair of claim 28 wherein the card pockets within the holder and is allowed to slide linearly between the retracted and extended positions.

30. The chair of claim 28 wherein the card is adapted to rotate about a vertical axis between the retracted and extended position.

31. The [operational guide] *chair* of claim 28 wherein the card includes a tab which protrudes from a main portion of the card, which tab is visible to and grippable by the occupant of the chair when the card is in the retracted position.

32. The [operational guide] *chair* of claim 28 wherein the pictorial guide includes both pictures and text.

* * * * *